May 6, 1924. Re. 15,830

L. V. LEWIS

RAILWAY TRAFFIC CONTROLLING SYSTEM

Original Filed March 4, 1918 4 Sheets-Sheet 1

INVENTOR:
L. V. Lewis,
BY A. L. Vencill
His ATTORNEY

May 6, 1924.

L. V. LEWIS

Re. 15,830

RAILWAY TRAFFIC CONTROLLING SYSTEM

Original Filed March 4, 1918 4 Sheets-Sheet 2

INVENTOR:
L. V. Lewis,
BY A. R. Venable
His ATTORNEY

May 6, 1924.

L. V. LEWIS

Re. 15,830

RAILWAY TRAFFIC CONTROLLING SYSTEM

Original Filed March 4, 1918 4 Sheets-Sheet 3

INVENTOR:
L. V. Lewis,
BY A. L. Stencill
His ATTORNEY

May 6, 1924.
Re. 15,830
L. V. LEWIS
RAILWAY TRAFFIC CONTROLLING SYSTEM
Original Filed March 4, 1918 4 Sheets-Sheet 4
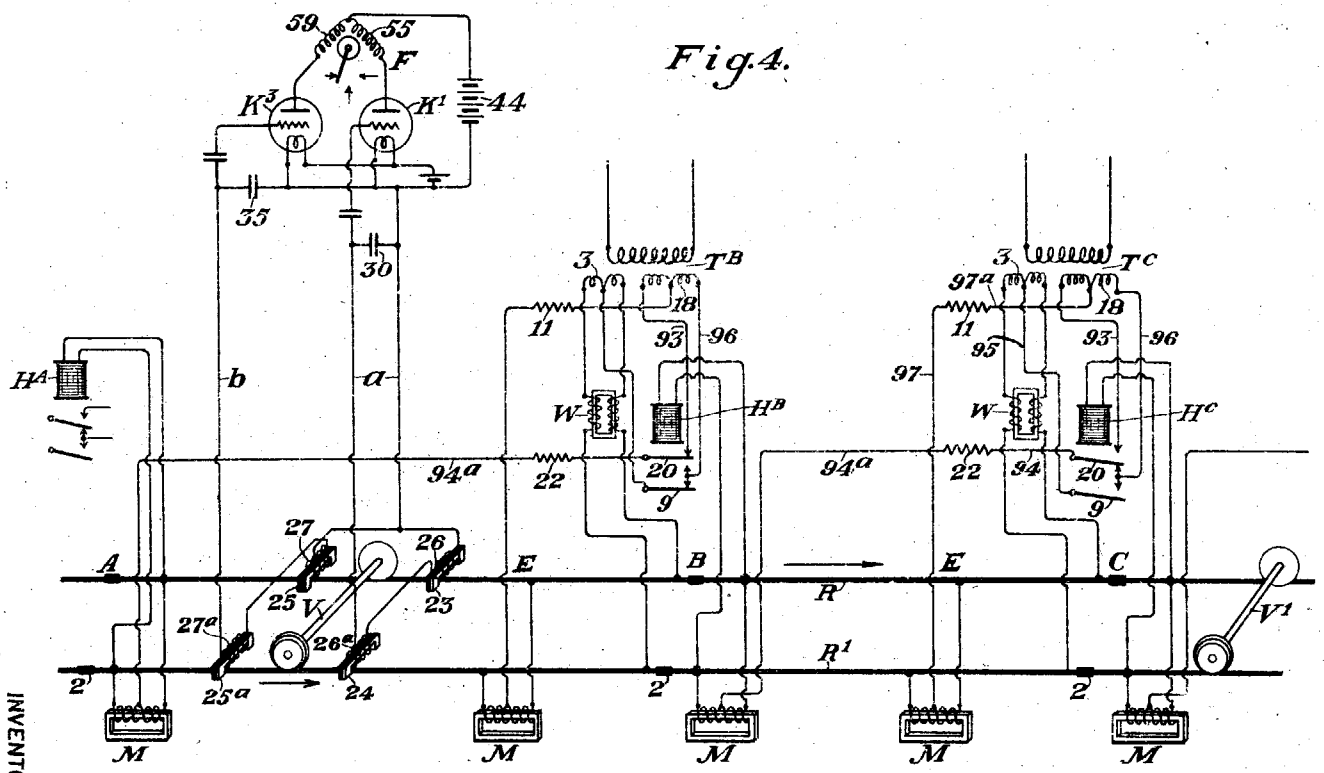
INVENTOR:
L. V. Lewis,
BY A. L. Vencill
His ATTORNEY Reissued May 6, 1924.

Re. 15,830

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING SYSTEM.

Original No. 1,405,527, dated February 7, 1922, Serial No. 220,172, filed March 4, 1918. Application for reissue filed April 19, 1922. Serial No. 555,639.

*To all whom it may concern:*

Be it known that I, LLOYD V. LEWIS, a citizen of the United States, residing at Edgewood Borough, in the county of Allegheny and State of Pennsylvania, have invented certain new and useful Improvements in Railway-Traffic-Controlling Systems, of which the following is a specification.

My invention relates to railway traffic controlling systems, and particularly to systems of the type wherein traffic governing means located on a train or vehicle is controlled by energy received from the trackway.

One object of my invention is the provision of a system of this character by virtue of which two distinct indications may be transmitted to the vehicle and which can be applied to existing signaling systems with the fewest possible changes in, and additions of apparatus.

I will describe certain forms of traffic controlling systems embodying my invention, and will then point out the novel features thereof in claims.

Figure 1:
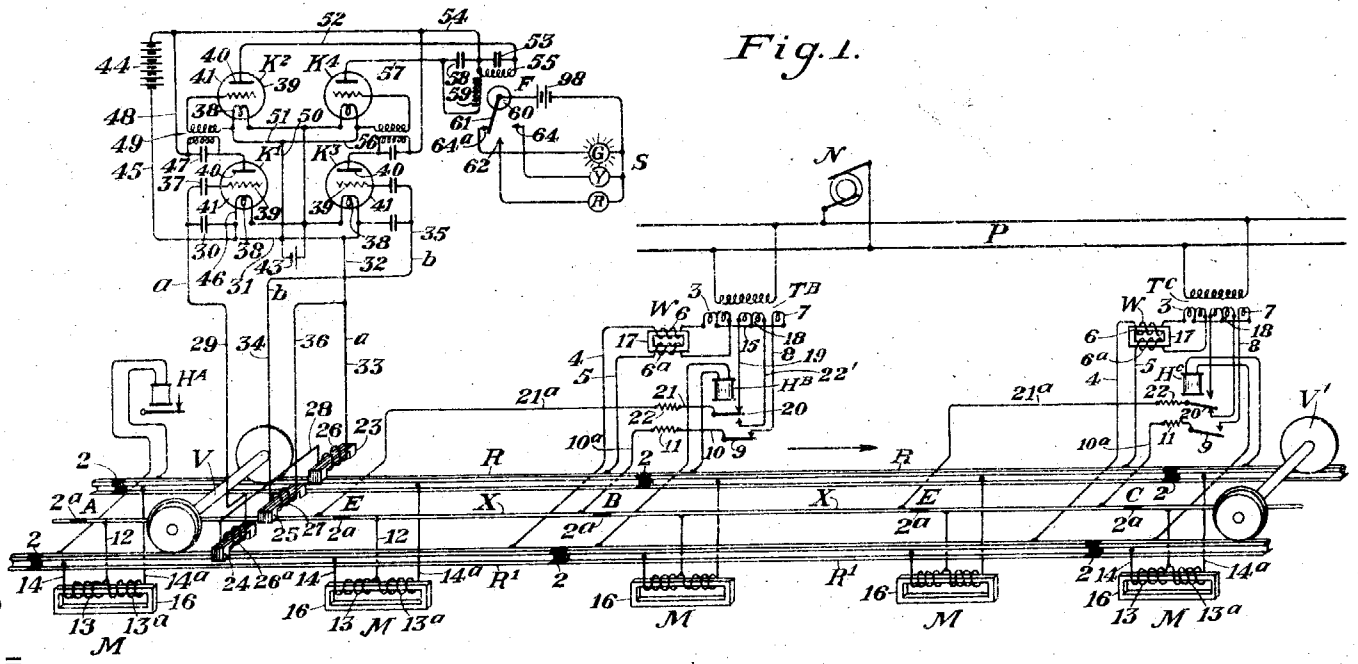
Figure 2:
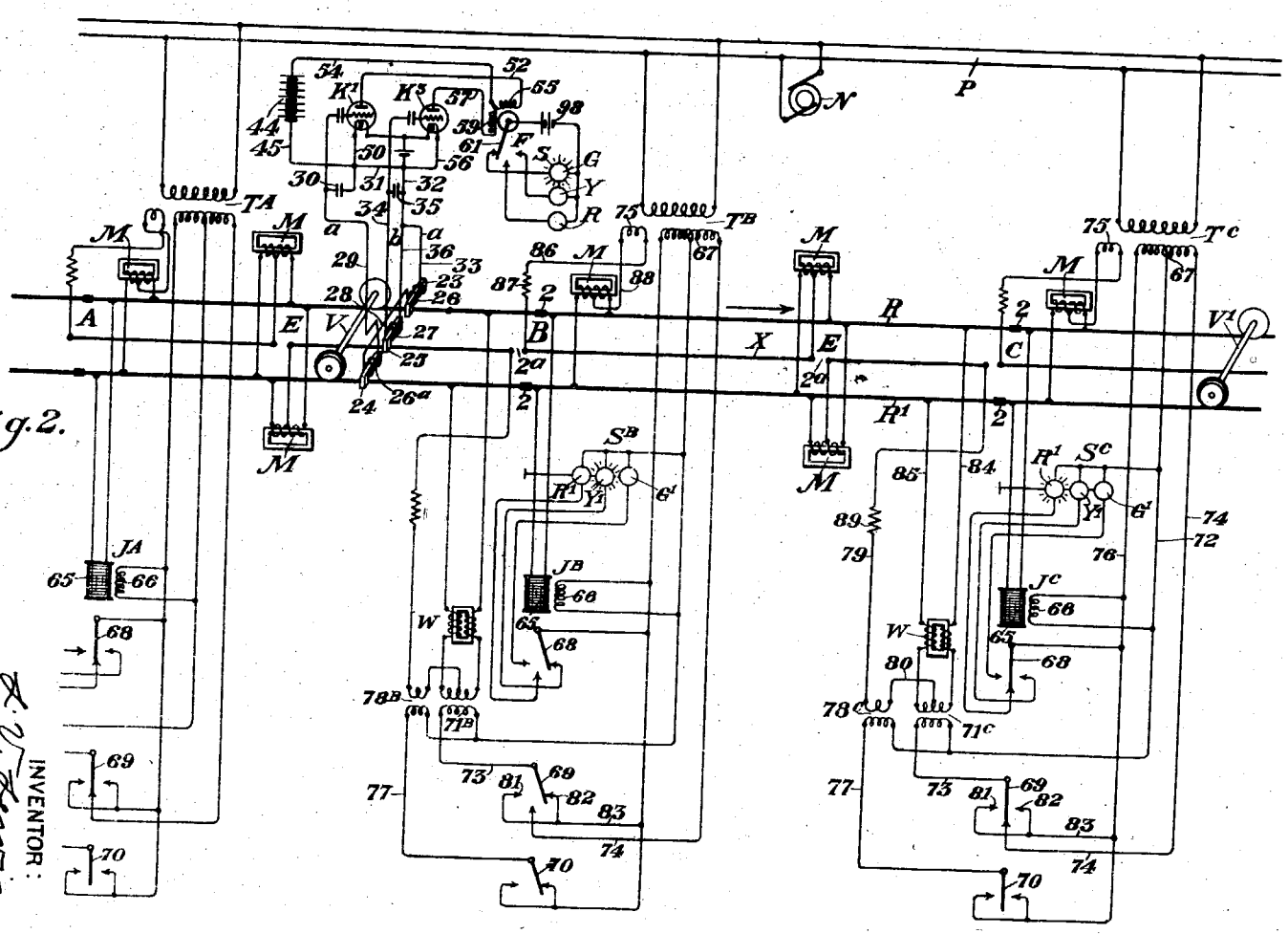
Figure 3:
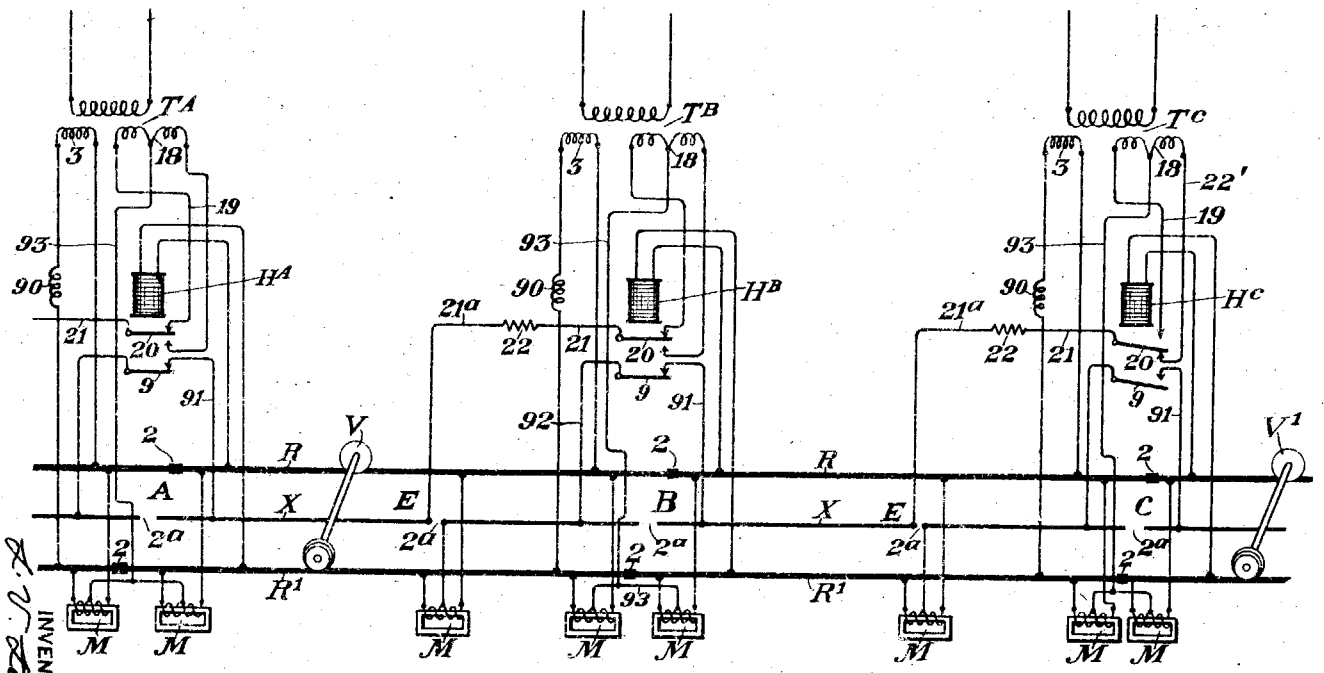

In the accompanying drawings, Fig. 1 is a diagrammatic view showing one form of traffic controlling system embodying my invention. Fig. 2 is a view showing a modification of the system shown in Fig. 1 and also embodying my invention. Figs. 3 and 4 are views showing still other modifications and also embodying my invention.

Similar reference characters refer to similar parts in each of the views.

Referring first to Fig. 1, the reference characters R, R′ designate the track rails of a railway, which rails are divided by insulated joints 2 to form blocks A—B, B—C, etc. Traffic along the railway is normally in the direction indicated by the arrow. Extending along the trackway is an auxiliary conductor X which is preferably, though not necessarily located midway between the track rails as shown in the drawing. This auxiliary conductor is divided, by insulation $2^a$ or otherwise, at points substantially opposite the insulations in the track rails, and is further divided in a similar manner at a point E within each block to form a rear and a forward section for the block. Thus within the limits of block A—B this auxiliary conductor is divided into a rear section A—E and a forward section E—B.

Each block is provided with a track circuit comprising as usual the track rails of the block, a source of alternating signaling current connected across the rails adjacent the exit end of the block, and a track relay connected across the rails adjacent the entrance end of the block. The source of current for each track circuit is a secondary of a transformer which is designated T with an exponent corresponding to the location, and the relay for each track circuit is designated by the reference character H, with an exponent corresponding to the location. For example, the track circuit for block B—C comprises the secondary 3 of transformer $T^c$ and relay $H^B$. Each secondary 3 is connected with the rails by conductors 4 and 5, which conductors include respectively the two windings 6 and $6^a$ of a reactor W, the function of which will be explained hereinafter. The track relay H for each block is connected directly across the track rails of the block, as shown.

The primary windings of the several transformers T are connected with transmission mains P which extend along the railway and to which alternating signaling current is supplied by suitable means, such as by a generator N.

Means are provided for each block for supplying alternating signaling current to the corresponding forward section of the auxiliary conductor X, this supply being controlled by the track relay for the block next in advance so that such supply is discontinued when the block in advance is occupied. As here shown, this current is supplied by a secondary 7 of the transformer T at the exit end of the block, and is controlled by a contact 9 of the track relay for the block next in advance. The return circuit for the current in conductor X is completed through the track rails in such manner that said current does not interfere with the supply of track circuit current to the track rails from transformer secondary 3. For example, the circuit for the advance section E—B of the auxiliary conductor for block A—B is from the secondary 7 of transformer $T^B$, through wire 8, contact 9 of track relay $H^B$, wire 10, resistance 11, wire $10^a$, conductor X, to wire 12; the circuit then divides into two similar branches, one branch being through winding 13 of a reactor M, wire 14, rail R′, wire 4 at location B, winding 6 of a reactor W, left-hand half of transformer secondary 3, and wire 15 to secondary 7. The other branch is from wire 12 through winding $13^a$ of reactor M, wire $14^a$, rail R, wire 5, winding $6^a$ of reactor W, right-hand half of secondary 3, and wire 15 to secondary 7. The reactor M comprises the two windings 13 and $13^a$ on an iron core 16, these windings being so arranged that when equal currents flow therethrough in the manner just traced, that is, from conductor X to the track rails or vice versa, the magnetic fluxes produced by the currents in the two windings oppose each other and so are neutralized, whereby this device offers a low impedance to such current flow. The device offers high impedance, however, to the flow of track circuit current from rail to rail, because such flow is through the two windings 13 and $13^a$ in series. The reactor W comprises the two windings 6 and $6^a$ on an iron core 17, these windings being so arranged that when currents flow therethrough from rails R and R′ to secondary 7 as described, the fluxes produced by the two windings neutralize each other and so the device offers a low impedance to such current flow. The track circuit current, however, flows from secondary 3 through winding 6 to rail R′ and back through winding $6^a$ (or vice versa), hence as to this current the windings 6 and $6^a$ are in series and so the device W offers considerable impedance to such current flow. One function of this device is to prevent an abnormal flow of current from secondary 3 when the track rails are bridged by the wheels and axles of a car or train. Another function will appear hereinafter.

The branch circuits from conductor X to secondary 7 just traced pass in opposite directions through the two halves of secondary 3, consequently secondary 3 will produce no electromotive force in the circuit of secondary 7. Likewise, since the circuit of secondary 7 is connected to the circuit of secondary 3 at two points both having an instantaneous potential midway between the potentials at the terminals of secondary 3, and hence having the same potential, it follows that secondary 7 will produce no electromotive force in the circuit of secondary 3.

Inasmuch as the supply of current to section E—B of the auxiliary conductor X is controlled by front contact 9 of the track relay for block B—C, it is apparent that this conductor section will be supplied with current only when block B—C is unoccupied.

Means are also provided for each block for supplying signaling current to the rear section of auxiliary conductor X for the block, this current supply likewise being controlled by the track relay for the block next in advance. The control in this instance is such, however, that current is constantly supplied to the rear conductor section, but that this current is of one relative polarity or the reverse according as the block next in advance is clear or occupied, it being understood that wherever the term "polarity" shall appear in this specification, or in the claims attached thereto, as a property of an alternating current or voltage, it shall be construed to mean the instantaneous relative polarity of that current or voltage. For example, when block B—C is clear, so that relay $H^B$ is closed, the circuit for the rear conductor section A—E of block A—B is from the left-hand section of winding 18 of transformer $T^B$, through wire 19, front point of contact 20 of relay $H^B$, wire 21, resistance 22, wire $21^a$, section A—E of conductor X, wire 12, thence in opposite directions through the two similar windings 13 and $13^a$ of reactor M at location A, the two rails R and R′ in multiple, thence in opposite directions through the two windings of reactor W at location B and of secondary 3 of transformer $T^B$, wire 15 to the middle point of secondary 18. The action of reactors M and W and of secondary 3 on current flowing in this circuit is the same as the action of these devices on the current flowing through the forward section of conductor X. The current which is thus supplied to the rear conductor section I will term current of "normal" polarity. When track relay $H^B$ is open, due to the presence of a car or train in block B—C or to some abnormal condition, the current for conductor section A—E flows from the right-hand half of secondary 18 of transformer $T^B$, through wire 22′, back point of relay contact 20, thence as before to the middle point of secondary 18. This current I will term current of "reverse" polarity.

It will be clear, therefore, that the current in conductor section A—E will be of normal or reverse polarity according as track relay $H^B$ is energized or de-energized, that is, according as block B—C is clear or is occupied. Furthermore, the currents in the sections of conductor X due to secondaries 7 and 18 are displaced in phase from the currents in the track circuits due to secondaries 3, because the circuits for the conductor sections include resistances 11 and 22, whereas the track circuits include the reactor W.

As shown in the drawing, block A—B is occupied by a car or other railway vehicle, represented by an axle and pair of wheels V. Mounted on this vehicle in advance of the forward axle are three U-shaped laminated iron cores 23, 24, and 25, each core being transversely disposed with respect to the track rails with its legs pointing downwardly. The cores 23 and 24 are located directly above the track rails R and R′, respectively, whereas core 25 is located directly above the auxiliary conductor X. It is apparent, therefore, that when alternating current flows in track rail R, some of the magnetic lines of force surrounding this rail will pass through core 23 and so there will be an alternating magnetic flux in this core. Currents in rail R′ and in conductor X similarly create magnetic flux in cores 24 and 25, respectively.

Cores 23 and 24 are provided with coils 26 and 26ᵃ, respectively, and core 25 is provided with a coil 27. Alternating flux in any one of the cores will, of course, create an alternating difference of potential across the terminals of the coil on such core. Coils 26 and 26ᵃ are included in series in a circuit which comprises coil 26, wire 28, coil 26ᵃ, wire 29, condenser 30, and wires 31, 32 and 33, which circuit I will, for convenience, designate circuit *a*. Coils 26 and 26ᵃ are connected in this circuit in such manner that the potentials created by currents flowing in the same direction in the track rails such as the current due to secondary 7, neutralize each other and so cause no current in circuit *a*, but that the potentials created by currents flowing in opposite directions in the track rails, such as the current due to secondary 3, are additive, and so cause a flow of alternating current in circuit *a*. That component of the track current which flows in opposite directions in the two rails, therefore, induces alternating current in circuit *a*, but the currents supplied to the auxiliary conductor do not create current in circuit *a* because they comprise a component of the track current which flows in the same direction in the two rails.

Coil 27 is included in a circuit *b*, which circuit comprises the coil 27, wire 34, condenser 35, and wires 32 and 36.

Coils 26 and 26ᵃ are so wound as to have high inductance, and condenser 30 has comparatively small capacity, and the circuit including these elements (circuit *a*) is tuned to resonance at the frequency of the signaling current, hence condenser 30 will be charged to a comparatively high potential by the comparatively feeble current induced in circuit *a* by current in the track rails. Circuit *b* is also tuned to resonance at the signaling current frequency, with similar results. It follows that when the vehicle V occupies a block in which signaling currents are supplied to the track circuit and to the auxiliary conductor X, currents will flow in circuits *a* and *b* on the vehicle, and these currents will be of the same frequency as, and will have the same phase displacement as, the currents in the track circuit and auxiliary conductor respectively. These currents, and the consequent potentials impressed on condensers 30 and 35, are, however, too feeble to reliably actuate traffic governing apparatus of a rugged character, hence I preferably provide suitable amplifying or relaying apparatus, which, in the form here shown, comprises electron relays or amplifiers K′, K², K³ and K⁴. Each of these relays comprises a vacuum bulb 41 containing a filament 38, a plate 40, and a grid 39 interposed between the two. The filaments 38 of these relays are constantly heated by a battery 43 through circuits which will be obvious from the drawing.

Condenser 30 of circuit *a* is connected across the filament 38 and grid 39 of relay K′, a blocking condenser 37 being included in the circuit. The plate circuit of relay K′ is from a battery 44, through wires 45 and 46, across the gap between filament 38 and plate 40 of relay K′, primary of transformer 49, wire 48 to battery 44. A condenser 47 is connected across the terminals of the primary of transformer 49, the circuit including this condenser and the transformer primary being tuned to resonance at the frequency of the signaling current. The secondary of transformer 49 is connected across the filament 38 and grid 39 of the electron relay K². The plate circuit of this latter relay is from battery 44 through wires 45, 31, 50 and 51, the gap between filament 38 and plate 40 of relay K², wire 52, winding 55 of a relay F, and wire 54 to battery 44. Connected across winding 55 is a condenser 53, the circuit comprising condenser 53 and winding 55 being tuned to resonance at the frequency of the signaling current. It will be seen, therefore, that relay winding 55 will be supplied with current of the same frequency as that which is supplied to the track circuit, but that this current will be of considerably greater magnitude and so is of sufficient value to reliably actuate an electromagnetic or induction motor relay of rugged design.

The current induced in the vehicle-carried circuit *b* is similarly amplified by the two electron relays K³ and K⁴, the plate circuit of the latter relay being from battery 44, through wires 45, 31, 50 and 56, the gap between the filament and the plate of relay K⁴, wire 57, winding 59 of relay F, thence through the wire 54 to battery 44. Connected across winding 59 is a condenser 58. Winding 59 is, therefore, supplied with current of the same frequency and relative phase as the current supplied to the section of the auxiliary conductor X over which the vehicle happens to be, but the current in winding 59 is, of course, of considerably greater magnitude than that which flows in circuit *b*.

The relay F is of the induction motor type, comprising a rotor member 60 which responds to currents displaced in phase in the windings 55 and 59, and which, in turn, actuates a contact member 61. Inasmuch as the currents in the track circuits and in the auxiliary conductor X are displaced in phase, it follows that the currents in relay windings 55 and 59 will similarly be displaced in phase, so that torque will be exerted on the rotor member 60 in one direction or the other, depending on the relative instantaneous polarities of the currents induced in circuits *a* and *b*. In other words, contact member 61 will be swung in one direction or the other from its middle position to which it is biased, according as the current in circuit *b* has one instantaneous polarity or the other with relation to the current in circuit *a*, that is, according as the current in conductor section A—E is of normal or reverse polarity.

The relay F may be employed to control any kind of traffic governing apparatus that may be desired. As here shown, this relay controls a signal S comprising three incandescent lamps G, Y and R, which lamps when illuminated indicate "proceed," "caution" and "stop," respectively. These lamps are supplied with current from a battery 98. When either or both windings of relay F are de-energized, so that contact member 61 occupies its intermediate position, contact 61—62 closes the circuit for lamp R, which circuit will be obvious from the drawing. When both windings of relay F are energized and the current in winding 59 is of normal polarity, contact member 61 is swung to the left into engagement with contact 64[a], so that the proceed lamp G is illuminated. When both relay windings are energized and the current in winding 59 is of reverse polarity, contact 61—64 is closed, so that the caution lamp Y becomes illuminated. It will be seen, therefore, that signal S on the vehicle indicates "stop," "caution," or "proceed," according as relay F is de-energized, energized in reverse direction, or energized in normal direction.

The operation of the system shown in Fig. 1 is as follows:

The block next in advance of location C is occupied by a vehicle which is represented by a pair of wheels and an axle V′, so that relay H[C] is de-energized. Current of reverse polarity is, consequently, supplied to the rear section B—E of the auxiliary conductor for block B—C, whereas the forward conductor section E—C for this same block is de-energized. Track relay H[B] is energized, so that forward conductor section E—B of block A—B is energized and current of normal polarity supplied to the rear conductor section A—E of this block. Vehicle V being over the rear conductor section of block A—B, circuit *a* is supplied with current from the track circuit and circuit *b* receives current of normal polarity due to the current in the conductor X. Relay F is, consequently, energized in normal direction, so that signal S indicates "proceed." As the vehicle V passes into the forward section of block A—B, no change occurs, because, of course, the current supplied to the forward conductor section is of normal polarity. When the vehicle V passes into block B—C, the circuit *a* continues to be energized due to track circuit current, but current of reverse polarity is now supplied to circuit *b*. Relay F, therefore, becomes energized in reverse direction, so that lamp Y becomes illuminated and signal S indicates "caution." After the vehicle passes point E in block B—C, the circuit *b* becomes de-energized, so that relay F likewise becomes de-energized, whereby lamp R becomes illuminated so that signal S then indicates "stop."

Assuming that vehicle V′ remains in the position shown and that the block in advance of the one occupied by this vehicle is unoccupied, it follows that the rear conductor section of the block occupied by vehicle V′ is supplied with current of normal polarity. Those portions of the track rails of this block which are in the rear of vehicle V′ are not supplied, however, with track circuit current because this current is shunted by the wheels and axles of vehicle V′. If, therefore, vehicle V enters the block occupied by vehicle V′, winding 59 of relay F will become energized, but winding 55 will become de-energized, so that relay F will continue to be de-energized and so signal S will continue to indicate "stop."

In the system shown in Fig. 1, the relative polarity of the current in the track circuits is always the same, that is, the track circuits are of the type which is generally known as "non-polarized." This system, then, is readily adapted for application to a railway which is already equipped with a signaling system embodying alternating current track circuits of the non-polarized type. When it is desired to apply a system embodying my invention to a railway which is already provided with a signaling system comprising "polarized" alternating current track circuits, the system shown in Fig. 2 may be preferable. This system does not interfere with the existing roadside signals, or with the control of these signals by the existing three-position alternating current track relays. The substantial difference between the systems shown in Figs. 1 and 2, so far as the present invention is concerned, is that in Fig. 1 the relative polarity of the track circuit current is constant and that of the current in the rear sections of the auxiliary conductor X is reversible, whereas in the system shown in Fig. 2 the polarity of the track circuit current is reversible and that of the currents in the auxiliary conductor X is constant.

Referring now to Fig. 2, the arrangement of blocks and of auxiliary conductor sections is the same as that shown in Fig. 1. In Fig. 2, however, each track relay, which is here designated by the reference character J with an exponent corresponding to the location, is of the three-position type, comprising two windings 65 and 66, the former of which is connected directly with the tra k rails and the latter of which is constantly supplied with alternating current from the left-hand section of secondary 67 of the adjacent transformer T. Each of these relays, therefore, responds to reversals of the relative polarity of the current in the corresponding track circuit with respect to that of the transmission line P; in other words, the contact fingers 68, 69 and 70 of each relay are swung to the left when the polarity of the track circuit is normal, and to the right when the polarity of the track circuit is reverse, and these contact fingers occupy vertical or intermediate positions when the track winding of the relay is de-energized.

Located at the entrance of each block is a roadside signal which is designated by the reference character S with an exponent corresponding to the location of the signal. As here shown, these signals are of the type known as "light signals," each comprising three electric lamps, G′, Y′ and R′, indicating "proceed," "caution," and "stop," respectively, when illuminated. Each signal S is controlled by contact finger 68 of the adjacent track relay in such manner that lamp G′ is illuminated when the relay is energized in the normal direction, lamp Y′ is illuminated when the relay is energized in reverse direction, and lamp R′ is illuminated when the relay is de-energized. These lamps are supplied with current from the left-hand section of secondary 67 of the adjacent transformer, and the circuits will be obvious from the drawing without further explanation.

The supply of current to the track circuit of each block is controlled by contact 69 of the track relay for the block next in advance, in such manner that the polarity of the track circuit current is normal when the relay is energized in either direction, and reverse when the relay is de-energized. The immediate source of supply for each track circuit is a transformer designated by the reference character 71 with an exponent corresponding to the location, the secondary of which transformer is connected across the track rails through a reactor W. The circuit for the primary of the transformer $71^C$, when relay $J^C$ is de-energized, is from the middle terminal of secondary 67 of transformer $T^C$, through wire 72, primary of transformer $71^C$, wire 73, contact finger 69 of relay $J^C$, and wire 74 to the right-hand terminal of transformer secondary 67. The current which is thus supplied to the track circuit of block B—C is of reverse polarity. When relay $J^C$ is energized in either normal or reversed direction, the circuit for the primary of transformer $71^C$ is from the middle terminal of secondary 67 of transformer $T^C$, through wire 72, primary of transformer $71^C$, wire 73, contact finger 69, contact 81 or 82, wire 83 and wire 76 to the left-hand terminal of transformer secondary 67. The current which is then supplied to the track circuit of block B—C is of normal polarity.

The current for the advance section of conductor X in each block is supplied from the right-hand section of secondary 67 of the transformer T at the exit end of such block through a transformer which is designated by the reference character 78 with an exponent corresponding to the location, and this supply is controlled by contact 70 of the track relay for the block next in advance. The primary circuit for transformer $78^C$, for example, is from the middle point of secondary 67 of primary $T^C$, through wire 72, primary of transformer $78^C$ wire 77, contact finger 70, and wire 76 to the left-hand terminal of secondary 67. It will be seen that this circuit will be closed when track relay $J^C$ is energized in either direction, but opened when this track relay is de-energized. The secondary circuit for transformer $78^C$ is from the secondary of this transformer through wire 79, resistance 89, conductor section E—C, reactor M at the rear end of such conductor section, rails R and R′ in multiple, wires 84 and 85 in multiple, the windings of reactor W in multiple, the two halves of the secondary of transformer $71^C$ in multiple, and wire 80 to the secondary of transformer $78^C$.

The rear section of conductor X for each block is supplied with current from a secondary 75 of the transformer T at the entrance end of such block. For example, the circuit for section B—E of this conductor in block B—C is from secondary 75 of transformer $T^B$, through wire 86, resistance 87, conductor section B—E in block B—C, reactor M at the forward end of such conductor section, rails R and R′ in multiple, reactor M at the rear end of said conductor section, and wire 88 to secondary 75. It will be seen, therefore, that current is constantly supplied to this section of the auxiliary conductor.

Owing to the fact that the track circuit current must pass through reactors W in such direction that these devices are reactive to such current, and to the fact that the currents for the sections of conductor X must pass through resistance 87 or 89, it follows that the track circuit current and the currents in the auxiliary conductors are displaced in phase.

The apparatus on the vehicle V in Fig. 2, is similar to that shown in Fig. 1, except that in Fig. 2 I have shown only one electron relay for each winding of the vehicle governing relay F. Condenser 30 in circuit *a* is connected with the filament and grid of relay K′, whereas condenser 35 of circuit *b* is connected with the filament and grid of relay $K^3$. Relay winding 55 is connected in the plate circuit of electron relay K′, and relay winding 59 is connected in the plate circuit of electron relay $K^3$. I have shown only two electron relays in Fig. 2 to indicate that this arrangement may be used instead of that shown in Fig. 1, if considered desirable. It is understood, however, that the single pair of electron relays may be used in combination with the trackway circuits shown in Fig. 1, and that likewise two pairs of such relays may be used in combination with the trackway circuits shown in Fig. 2.

The operation of the system shown in Fig. 2 will now be readily understood and may be briefly explained as follows:

Inasmuch as the block directly in advance of location C is occupied by vehicle V′, track relay $J^C$ is de-energized, so that signal $S^C$ indicates "stop" and the polarity of the track circuit current in block B—C is reverse. Conductor section E—C of this block is de-energized, but conductor section B—E of the same block is, of course, energized. Track relay $J^B$ is, consequently, energized in reverse direction, so that signal $S^B$ indicates "caution." The polarity of the track circuit current in block A—B is normal, and both conductor sections for this block are energized. The vehicle V being in block A—B, relay F is energized in normal direction, so that signal S indicates "proceed." As this vehicle enters block B—C, the polarity of the current in its circuit *a* will be reversed, so that signal S will change to "caution." As the vehicle enters section E—C of this block, current will cease to flow in circuit *b*, so that relay F will become de-energized, and, consequently, signal S will indicate "stop."

Referring now to Fig. 3, the arrangement of blocks and auxiliary conductor sections is the same as that shown in Fig. 1. The track circuits are likewise the same as those shown in Fig. 1, except that the reactors W are omitted and a single reactance 90 is included between each transformer secondary 3 and one of the track rails. The control of the supply of current to the sections of conductor X is different from that shown in Fig. 1, however, and is as follows:

The rear conductor section for each block is connected in series with the forward section of the block in the rear, and current of normal or reverse polarity is at times supplied to these two sections simultaneously. Considering, for example, section B—E of block B—C and section E—B of block A—B, and assuming that track relays $H^B$ and $B^C$ are energized, the circuit is as follows: From the left-hand terminal of secondary 18 of transformer $T^C$, through wire 19, front point of contact 20 of relay $H^C$, wire 21, resistance 22, wire $21^a$, conductor section B—E of block B—C, wire 91, contact 9 of relay $H^B$, wire 92, conductor section E—B of block A—B, reactor M at the rear end of this conductor section, rails R and R′ in multiple, reactor M at the forward end of the latter conductor section, wire 93, reactor M at the rear end of section B—C in multiple, reactor M at the forward end of section E—C, and wire 93 to the middle terminal of secondary 18. The current which flows in this circuit is of normal polarity. When track relay $H^C$ is de-energized, the circuit is from the right hand terminal of secondary 18 of transformer $T^C$, through wire 22′, back point of contact 20 of relay $H^C$, and then through the remainder of the circuit as before. The current which then flows in the auxiliary conductor sections is of reverse polarity.

The operation of the system shown in Fig. 3 is as follows:

The block immediately in advance of location C being occupied by a vehicle V′, track relay $H^C$ is de-energized, so that conductor section E—C is de-energized by virtue of the fact that contact 9 of relay $H^C$ is open. The back point of contact 20 of this same relay being closed, current of reverse polarity is supplied to the rear conductor section of block B—C and to the forward conductor section of block A—B. The rear section of block A—B is occupied by a vehicle V, which is equipped with traffic governing apparatus which may be similar to that shown in Fig. 1, or to that shown in Fig. 2. Relay $H^B$ being energized, the auxiliary conductor section under this vehicle V is receiving current of normal polarity so that the signal on such vehicle indicates "proceed." As this vehicle passes point E in block A—B, the current in the circuit *b* therein becomes reversed, so that the signal on the vehicle changes to "caution" indication. The signal continues to indicate "caution" after the vehicle passes point B, and until it reaches point E in block B—C. After passing this latter point, the vehicle-carried circuit *b* becomes de-energized, so that the signal on the vehicle changes to "stop" indication.

It will be seen that the system shown in Fig. 3 provides for an overlap so far as the vehicle governing apparatus is concerned, that is, that a caution indication is received on the vehicle at some distance in the rear of the block in the rear of an occupied block, and that the stop indication is received on the vehicle at a point some distance in the rear of an occupied block.

In the systems shown in Figs. 1, 2 and 3, it will be noted that the current which is supplied to the auxiliary conductor returns through the track rails, this current flowing in the same direction in the two rails. It follows, then, that instead of collecting this current from the auxiliary conductor it may, if desired, be collected from the track rails, and in Fig. 4 I have illustrated one form of system in which this is done.

Referring now to Fig. 4, the track rails R and R′ are divided into blocks A—B, B—C, etc., as in the preceding views, and each block is provided with a track circuit comprising a transformer secondary 3 and a track relay H exactly as in Fig. 1. The vehicle V is provided with a circuit *a* in which current is induced by virtue of the component of the track current which flows in opposite directions in the two rails, and this current in circuit *a* causes the energization of winding 55 of relay F through the medium of electron relay K′. Thus far the apparatus is substantially the same as that shown in Fig. 1.

Means are provided for each block for supplying a second alternating current thereto, which current flows in the same direction in both rails of the block, and the polarity of which current is normal or reverse according as the next block in advance is free or occupied. For example, when track relay $H^c$ is energized, the path of this current in block B—C is from the left-hand terminal of secondary 18 of transformer $T^c$, through wire 93, front point of contact 20 of relay $H^c$, wire 94, resistance 22, wire $94^a$, reactor M at location B, thence through the two rails R and R′ of block B—C in multiple to location C, thence in multiple through the windings of reactor W and the two halves of transformer secondary 3, wire 95, contact 9 of relay $H^c$, and wire 96 to the right-hand terminal of transformer secondary 18. The current which flows in this circuit is of normal polarity with respect to the track circuit current supplied by secondary 3. When relay $H^c$ is de-energized, the path of the current in block B—C is from the right-hand terminal of secondary 18 of transformer $T^c$, through wire 96, back point of contact 20 of relay $H^c$, wire 94, resistance 22, wire $94^a$, reactor M at location B, thence through rails R and R′ in multiple to point E in block B—C, thence through the windings of reactor M at this point, wire 97, resistance 11, and wire $97^a$, to the middle point of secondary 18. The current which flows in this circuit is of reverse polarity with respect to the track circuit current and it will be noted that it flows in the track rails only between points B and E in block section B—C.

The vehicle V is provided with two laminated soft iron cores 25 and $25^a$ disposed above rails R and R′ respectively, and which cores are preferably located in the rear of the vehicle. These cores carry windings 27 and $27^a$ respectively, which windings are included in series in the vehicle-carried circuit *b*. The windings 27 and $27^a$ are so arranged that the currents induced therein by currents flowing in the same direction in the track rails are additive so that such track currents produce an alternating current in circuit *b*. This current in circuit *b* causes alternating current to be supplied to winding 59 of relay F through the medium of electron relay $K^3$.

The operation of the system shown in Fig. 4, is as follows:

The block in advance of location C being occupied by vehicle V′, track relay $H^c$ is de-energized, so that current of reverse polarity is supplied to the track rails of block B—C between points B and E from secondary 18 of transformer $T^c$. Track relay $H^B$ being energized, current of normal polarity is supplied to the rails of block A—B from secondary 18 of transformer $T^B$. Relay F on vehicle V is, consequently, supplied with currents of such phase relation that this relay is energized in normal direction. As the vehicle V proceeds past point E in block A—B, no change occurs in the vehicle-carried apparatus, but as the vehicle passes point B, the relative polarity of the current supplied to circuit *b* is reversed, so that relay F becomes reversely energized. As the vehicle passes point E in block B—C, the supply of current to the circuit *b* is discontinued, so that relay F becomes de-energized.

One important feature of the systems shown herein is that they provide for transmitting two distinctive signals to a vehicle with the use of signaling current of but one frequency. For this reason, the invention is easily applied to a railway which is already equipped with a signaling system embodying alternating current track circuits, the only substantial changes which are necessary being the installation of the auxiliary conductor X, the reactors M and W, and suitable equipment on the cars or trains. An alternating current transmission line is already in existence in such instances, and this line can be used to supply all the track-way current required for the entire vehicle control and signaling system.

Although I have herein shown and described only certain forms of railway traffic controlling systems embodying my invention, it is understood that various changes and modifications may be made therein within the scope of the appended claims without departing from the spirit and scope of my invention.

Having thus described my invention, what I claim is:

1. Railway traffic controlling apparatus comprising track rails, an auxiliary conductor parallel therewith, means for supplying alternating currents to said rails and conductor, means controlled by traffic conditions for varying the character of one of said currents, means for procuring on the vehicle two currents having the same characteristics as the trackway currents, and vehicle-carried traffic governing means controlled jointly by the currents produced on the vehicle.

2. Railway traffic controlling apparatus comprising track rails, an auxiliary conductor parallel therewith, means for supplying alternating currents to said rails and conductor, means controlled by traffic conditions for varying the phase of one of said currents with respect to the other, and vehicle-carried traffic governing means controlled by the phase relations of said currents and by the presence and absence of said currents.

3. Railway traffic controlling apparatus comprising track rails, means for supplying two alternating currents thereto, a vehicle-carried traffic relay having two windings, and requiring currents in both windings to give a proceed signal, and vehicle-carried means controlled selectively by said two currents in the track rails for supplying alternating currents to said two windings.

4. Railway traffic controlling apparatus comprising track rails, means for applying an alternating difference of potential across said rails, and another alternating difference of potential along said rails, and vehicle-carried traffic governing means controlled jointly by the currents in said track rails due to said potential differences.

5. Railway track controlling apparatus comprising track rails, a source of alternating signaling current connected across said rails, a second trackway circuit including a second source of alternating signaling current, a vehicle-carried relay having two windings, and vehicle-carried means controlled by said trackway currents for supplying alternating currents to said two relay windings.

6. Railway traffic controlling apparatus comprising track rails, a source of alternating signaling current connected across said rails, a second trackway circuit including a second source of alternating signaling current, a vehicle-carried relay having two windings, and vehicle-carried means controlled by said first trackway current for supplying alternating current to one winding of said relay, and other vehicle-carried means controlled by current in said second trackway circuit for supplying alternating current to said other relay winding.

7. Railway traffic controlling apparatus comprising track rails, means for supplying two alternating currents thereto, one of which flows in opposite directions in the two rails and the other of which flows in the same direction in the two rails, a vehicle-carried relay having two windings, and vehicle-carried means controlled by said two currents respectively in the two track rails for supplying alternating currents to said two windings.

8. Railway traffic controlling apparatus comprising track rails, means for supplying two alternating currents thereto, one of which flows in opposite directions in the two rails and the other of which flows in the same direction in the two rails, traffic governing means on a vehicle comprising two windings, vehicle-carried means controlled by one only of said currents in the rails for supplying alternating current to one of said windings, and other vehicle-carried means controlled only by the other current in the rails for supplying alternating current to the other winding.

9. Railway traffic controlling apparatus comprising means for supplying alternating currents differing in phase to the trackway, a relay carried on a train and having two windings, and means also on the train controlled by said currents in the trackway for supplying alternating currents to the windings of said relay of the same relative phases as the currents in the trackway.

10. Railway traffic controlling apparatus comprising a relay carried on a vehicle and having two windings, means also on the vehicle for supplying currents differing in phase to said two relay windings and means located in the trackway for selectively controlling said means.

11. In combination, a block of railway track, an auxiliary conductor, means for supplying one alternating signaling current to the track rails of said block, means for supplying another alternating signaling current to said rails and said conductor, and vehicle governing means controlled by said two currents.

12. In combination, a block of railway track, an auxiliary conductor for said block, a vehicle controlling circuit the two sides of which are formed by the two track rails of said block, a second vehicle controlling circuit one side of which includes said two rails in multiple and the other side of which comprises said auxiliary conductor, and means for supplying alternating currents to said two circuits.

13. In combination, a block of railway track, an auxiliary conductor, means for supplying one alternating signaling current to the track rails of said block, means for supplying another alternating signaling current to said rails and said conductor, means controlled by traffic conditions in advance for changing the relative polarity of one of said currents, a railway vehicle, a relay on said vehicle having two windings and a movable member operated in one direction or another according to the phase relation of the currents in said windings, and means on the vehicle for supplying to said relay windings currents having the same relative polarity as the currents in the track rails.

14. In combination, a block of railway track, a trackway circuit comprising the two track rails of said block in series, a secondary trackway circuit comprising said two track rails in multiple, means for supplying alternating currents to said circuits and train carried traffic governing means controlled by the currents in said trackway circuits.

15. In combination, a block of railway track, a trackway circuit comprising the two track rails of said block in series, a second trackway circuit comprising said two track rails in multiple, means for supplying alternating currents of the same frequency but differing in phase to said two trackway circuits, and vehicle carried traffic governing means controlled by the currents in said circuits.

16. In combination, a block of railway track, a trackway circuit comprising the two track rails of said block in series, a second trackway circuit comprising said two track rails in multiple, means for supplying alternating currents of the same frequency but differing in phase to said two trackway circuits, a vehicle carried relay having two windings, means on the vehicle for supplying alternating currents to said windings having the same phase displacement as the currents in said two trackway circuits, and traffic governing means on the vehicle controlled by said relay.

17. In combination, a block of railway track, a trackway circuit comprising the two track rails of said block in series, a second trackway circuit comprising said two track rails in multiple, means for supplying alternating currents of the same frequency to said two trackway circuits, means for reversing the relative polarity of the current in one of said circuits, and vehicle carried traffic governing means controlled by the currents in said trackway circuits and responsive to the relative polarity of said currents.

18. In combination, a block of railway track, a trackway circuit comprising the two track rails of said block in series, a second trackway circuit comprising said two track rails in multiple, means for supplying alternating currents of the same frequency to said two trackway circuits, means for reversing the relative polarity of the current in one of said circuits, a vehicle-carried relay having two windings, means on the vehicle for supplying to said two windings alternating currents having the same relative polarity as the currents in said trackway circuits, and traffic governing means on the vehicle controlled by said relay.

19. In combination, a block of railway track, a trackway circuit comprising the two track rails of said block in series, a second trackway circuit comprising said two track rails in multiple, means for supplying alternating currents of the same frequency to said two trackway circuits, means for reversing the relative polarity of the current in one of said circuits, a vehicle-carried relay having two windings and a member movable in one direction or another according to the relative polarity of the currents in said windings, means on the vehicle for supplying to said two windings alternating currents having the same relative polarity as the currents in said trackway circuits, and traffic governing means on the vehicle controlled by said movable relay member.

20. In combination, a block of railway track, a transformer secondary 3 connected across the track rails of said block adjacent the exit end, a first impedance connected across the rails adjacent the entrance end of said block, a second impedance connected across the rails at an intermediate point in said block, a transformer secondary 18 the middle point of which is connected with the middle point of said second impedance, means controlled by traffic conditions in advance of said block for at times connecting the middle point of said first impedance with one terminal of said secondary 18 and the middle point of said secondary 3 with the other terminal of secondary 18, and for at other times connecting the middle point of the first impedance with the last-mentioned terminal of secondary 18 and disconnecting the middle point of secondary 3 form secondary 18, and train carried traffic governing means controlled by the currents flowing in the track rails from said transformer secondaries.

21. In combination, a block of railway track, means for applying an alternating difference of potential across the rails adjacent the exit end of said block, means for applying a second alternating difference of potential along the rails from the entrance end of the block to an intermediate point of the block, or from the entrance end to the exit end of the block, and vehicle carried traffic governing means controlled by the currents flowing in said track rails due to said potential differences.

22. In combination, a block of railway track, means for applying an alternating difference of potential across the rails at the exit end of said block, means for applying a second alternating difference of potential of the same frequency but of one relative polarity along the rails of a portion of said block or of the reverse relative polarity along the rails of the entire block, and vehicle carried traffic governing means controlled by the currents in the rails due to said potential differences and by the relative polarities of said currents.

23. In combination, a block of railway track, a source of alternating current connected across the rails adjacent the exit end of said block, a second source of alternating current connected along the rails from the entrance end to an intermediate point in said block or from the entrance end to the exit end of said block, and vehicle carried traffic governing means controlled by the currents in the track rails from said sources.

24. In combination, a block of railway track, a trackway circuit comprising the two track rails of said block in series, means for supplying alternating current to said circuit, a second trackway circuit controlled by traffic conditions in advance and including in multiple the two rails of a portion of said block or of the entire block according to said traffic conditions, means for supplying to said second circuit alternating current of the same frequency as to the first, and vehicle-carried traffic governing means controlled by the currents in said two trackway circuits.

25. In combination, a block of railway track, a trackway circuit comprising the two track rails of said block in series, means for supplying alternating currents to said circuit, a second trackway circuit controlled by traffic conditions in advance and including in multiple the two rails of a portion of said block or of the entire block according to said traffic conditions, means for supplying to said second circuit alternating current of the same frequency as to the first, a vehicle carried relay having two windings, means on the vehicle controlled by currents in said two trackway circuits for supplying currents to said two relay windings respectively, and traffic governing means on the vehicle controlled by said relay.

26. In combination, a block of railway track, a trackway circuit comprising the two track rails of said block in series, means for supplying alternating current to said circuit, a second trackway circuit controlled by traffic conditions in advance and including in multiple the two rails of a portion of said block or of the entire block according to said traffic conditions, means for supplying to said second circuit alternating current of the same frequency as to the first, means for reversing the relative polarity of the current in one of said circuits, and vehicle governing means on a vehicle controlled by the relative polarity of the currents in said two circuits.

27. In combination, a block of railway track, a trackway circuit comprising the two track rails of said block in series, means for supplying alternating current to said circuit, a second trackway circuit controlled by traffic conditions in advance and including in multiple the two rails of a portion of said block or of the entire block according to said traffic conditions, means for supplying to said circuit alternating current of the same frequency as to the first, means for reversing the relative polarity of the current in one of said circuits, a vehicle-carried relay having two windings, means on the vehicle for supplying to said windings alternating currents having the same relative polarity as the currents in said trackway circuits, and traffic governing means on the vehicle controlled by said relay.

28. Railway traffic controlling apparatus comprising track rails, a trackway circuit comprising the two rails in series and a source of alternating current, a second trackway circuit including the two rails in multiple and a second source of alternating current of the same frequency as the first, a reactive impedance in one of said circuits and a non-inductive impedance in the other circuit, and vehicle-carried traffic governing means controlled by the currents in said trackway circuits.

29. Railway traffic controlling apparatus comprising track rails, a trackway circuit comprising the two rails in series and a source of alternating current, a second trackway circuit including the two rails in multiple and a second source of alternating current of the same frequency as the first, means for causing phase displacement of the currents in said circuits, and vehicle carried traffic governing means controlled by the currents in said circuits.

30. Railway traffic controlling apparatus comprising track rails, a trackway circuit comprising the two rails in series and a source of alternating current, a second trackway circuit including the two rails in multiple and a second source of alternating current of the same frequency as the first, means for causing phase displacement of the currents in said two circuits, means for reversing the relative polarity of the current in one of said circuits, and vehicle carried traffic governing means controlled by the currents in said two circuits and responsive to the phase relation of such currents.

31. Railway traffic controlling apparatus comprising track rails, a trackway circuit comprising the two rails in series, a second trackway circuit comprising the two rails in multiple, means for supplying to said circuits alternating currents of the same frequency but differing in phase, and vehicle carried traffic governing means controlled by the currents in said two circuits.

32. In combination, a block of railway track, two impedances connected across the track rails at different points in the block, means for connecting the two terminals of a source of alternating current with the middle points of said two impedances, means for connecting the two terminals of a second source of alternating current across the rails adjacent the exit end of the block, means for causing phase displacement of the currents from said two sources, and vehicle carried traffic governing means controlled by the currents flowing in the rails.

33. In combination, a block of railway track, a first impedance connected across the track rails adjacent the entrance end of the block, a second impedance connected across the rails at an intermediate point in the block, a third impedance connected across the rails adjacent the exit end of the block, means controlled by traffic conditions in advance of said block for applying an alternating difference of potential to the middle points of the first and second impedances or to the middle points of the first and third impedances, means for creating an alternating difference of potential across the track rails adjacent the exit end of the block and vehicle carried traffic governing means controlled by the currents in the track rails due to said differences of potential.

34. In combination, a block of railway track, a first impedance connected across the track rails adjacent the entrance end of the block, a second impedance connected across the rails at an intermediate point in the block, a third impedance connected across the rails adjacent the exit end of the block, means controlled by traffic conditions in advance of said block for applying an alternating difference of potential to the middle points of the first and second impedances or to the middle points of the first and third impedances, means for creating an alternating difference of potential across the track rails adjacent the exit end of the block, the two differences of potential thus applied to the rails being of the same frequency but displaced in phase, means controlled by traffic conditions in advance for reversing the polarity of one of said potential differences, and vehicle carried traffic governing means controlled by the currents in the rails due to said potential difference and responsive to changes in the phase relation of said currents.

35. In combination, a block of railway track, a trackway circuit comprising the two track rails of said block in series, means for supplying alternating current to said circuit, a second trackway circuit comprising the two rails of a portion of the block on the two rails of the entire block in multiple, means for supplying to said second circuit alternating current of the same frequency as to the first circuit but of one relative polarity or the other according as the circuit includes a portion or all of the block, and vehicle carried traffic governing means controlled by the currents in said trackway circuits and responsive to the relative polarity of said currents.

36. In combination, a block of railway track, an auxiliary conductor, means for supplying one alternating signaling current to the track rails of said block, means for supplying another alternating signaling current to said rails and said conductor, means controlled by traffic conditions in advance for varying the relative polarity of one of said currents, and vehicle carried means controlled by said trackway currents and arranged to give a proceed or a caution signal according as said currents have one relative polarity or the other and a stop signal in the absence of either current.

37. Railway traffic controlling apparatus comprising a block section of a railway track, a source of alternating current connected across the rails adjacent the exit end of the block, means for causing a second alternating current to flow in the same direction along the two rails of the block from the entrance end to an intermediate point in the block or from the entrance end to the exit end of the block, means for reversing the polarity of one of said sources of current, and vehicle carried traffic governing means controlled by said two currents in the track rails of the block.

38. Railway traffic controlling apparatus comprising a railway vehicle provided with two receiving circuits, means located in the trackway for supplying said receiving circuits with alternating currents of the same frequency, a relay on the vehicle having two windings controlled by the currents supplied to said two receiving circuits respectively, amplifying means interposed between each receiving circuit and the corresponding relay winding, and means controlled by said relay for governing the vehicle.

39. Railway traffic controlling apparatus comprising a railway vehicle provided with two receiving circuits, means located in the trackway for supplying said receiving circuits with alternating currents of the same frequency, but differing in phase, an induction motor relay on the vehicle having two stator windings, amplifying means interposed between said receiving circuits and said relay windings for suppplying said windings with currents of the same relative phases as those in the receiving circuits but of greater amplitude, and means controlled by said relay for governing the vehicle.

40. Railway traffic controlling apparatus comprising a railway vehicle provided with two receiving circuits, means located in the trackway for supplying said receiving circuits with alternating currents of the same frequency, but differing in phase, two electron tube amplifiers on said vehicle, a grid circuit for each amplifier one energized from one receiving circuit and the other from the other receiving circuit, a plate circuit for each amplifier, an induction motor relay on said vehicle having two stator windings controlled by said two plate circuits respectively, and means controlled by said relay for governing the vehicle.

41. Railway traffic controlling apparatus comprising a railway vehicle provided with two receiving circuits, means located in the trackway for supplying said receiving circuits with alternating currents of the same frequency, two electron tube amplifiers on said vehicle, a grid circuit for one amplifier energized from one of said receiving circuits and a grid circuit for the other amplifier energized from the other receiving circuit, a plate circuit for each amplifier, a relay on said vehicle having two windings controlled by said two plate circuits respectively, and means controlled by said relay for governing the vehicle.

42. Railway traffic controlling apparatus comprising a railway vehicle provided with two receiving circuits, means located in the trackway for supplying said receiving circuits with alternating currents of the same frequency, but differing in phase, an induction motor relay on the vehicle having two stator windings, an electron tube amplifier interposed between one receiving circuit and one relay winding, a second electron tube amplifier interposed between the other receiving circuit and the other relay winding, and means controlled by said relay for governing the vehicle.

43. Railway traffic controlling apparatus comprising a vehicle provided with two receiving circuits each including a condenser, means located in the trackway for supplying said receiving circuits with alternating currents of the same frequency but differing in phase, two electron tube amplifiers on said vehicle, means for connecting the filament and grid of one amplifier across the condenser in one receiving circuit, means for connecting the filament and grid of the other amplifier across the condenser in the other receiving circuit, a plate circuit for each amplifier including a source of direct current, an induction motor relay on the vehicle having two stator windings controlled by the current variations in said two plate circuits respectively, and means controlled by said relay for governing the vehicle.

44. Railway traffic controlling apparatus comprising a vehicle provided with two receiving circuits each including a condenser, means located in the trackway for supplying said receiving circuits with alternating currents of the same frequency but differing in phase, two electron tube amplifiers on said vehicle, means for connecting the filament and grid of one amplifier across the condenser in one receiving circuit, means for connecting the filament and grid of the other amplifier across the condenser in the other receiving circuit, a blocking condenser interposed between each receiving circuit and the grid of the associated amplifier, a plate circuit for each amplifier including a source of direct current, an induction motor relay on the vehicle having two stator windings controlled by the current variations in said two plate circuits respectively, and means controlled by said relay for governing the vehicle.

45. Railway traffic controlling apparatus comprising a vehicle provided with two receiving circuits, means located in the trackway for supplying said circuits with alternating currents of the same frequency but differing in phase, said circuits being tuned to resonance at the frequency of such currents, a relay on said vehicle having two windings, amplifying means interposed between said receiving circuits and said relay windings for supplying said windings with currents of the same relative phases as those in the receiving circuits but of greater amplitude, and means controlled by said relay for governing said vehicle.

46. Railway traffic controlling apparatus comprising track rails, means for supplying two alternating currents thereto one of which flows in opposite directions in the two rails and the other of which flows in the same direction in the two rails, a vehicle provided with a receiving circuit including two coils arranged in inductive relation with the two track rails respectively and so connected in the circuit that the voltages induced therein by the first mentioned current are additive and the voltages induced therein by the second mentioned current oppose each other, a second receiving circuit on said vehicle including two coils arranged in inductive relation with the two track rails respectively and so connected in their circuit that the voltages induced therein by the second current are additive and the voltages induced therein by the first current oppose each other, a relay on said vehicle having two windings controlled by currents in said two receiving circuits respectively, and means controlled by said relay for governing the vehicle.

47. Railway traffic controlling apparatus comprising track rails, means for supplying two alternating currents thereto one of which flows in opposite directions in the two rails and the other of which flows in the same direction in the two rails, said currents being of the same frequency but differing in phase, a vehicle provided with a receiving circuit including two coils arranged in inductive relation with the two track rails respectively and so connected in the circuit that the voltages induced therein by the first mentioned current are additive and the voltages induced therein by the second mentioned current oppose each other, a second receiving circuit on said vehicle including two coils arranged in inductive relation with the two track rails respectively and so connected in their circuit that the voltages induced therein by the second current are additive and the voltages induced therein by the first current oppose each other, an induction motor relay on said vehicle having two stator windings controlled by currents in said two receiving circuits respectively, and means controlled by said relay for governing the vehicle.

48. Railway traffic controlling apparatus comprising track rails, means for supplying two alternating currents thereto one of which flows in opposite directions in the two rails and the other of which flows in the same direction in the two rails, said currents being of the same frequency but differing in phase, a vehicle provided with a receiving circuit including two coils arranged in inductive relation with the two track rails respectively and so connected in the circuit that the voltages induced therein by the first mentioned current are additive and the voltages induced therein by the second mentioned current oppose each other, a second receiving circuit on said vehicle including two coils arranged in inductive relation with the two track rails respectively and so connected in their circuit that the voltages induced therein by the second current are additive and the voltages induced therein by the first current oppose each other, an induction motor relay on said vehicle having two stator windings amplifying means interposed between said receiving circuits and said windings for supplying to said windings currents of the same relative phases as those in the receiving circuits but of greater amplitude, and vehicle governing means controlled by said relay.

49. Railway traffic controlling apparatus comprising a stretch of track divided into blocks, a track circuit for each block including a source of current and a track relay, and means controlled by the track relay of each block for supplying vehicle governing current to the rails of the block next in the rear from the entrance end of such block to an intermediate point therein or from the entrance end of such block to the exit end thereof.

50. Railway traffic controlling apparatus comprising a stretch of track divided into blocks, a track circuit for each block including a source of current and a track relay, and means controlled by the track relay of each block for supplying vehicle governing current to a portion or all of the block next in the rear according as the relay is de-energized or energized.

51. Railway traffic controlling apparatus comprising a stretch of track divided into blocks, a track circuit for each block including a source of current and a track relay, and means for supplying vehicle governing current to the rails of each block from the entrance end to an intermediate point or from the entrance end to the exit end according as the track relay for the block next in advance is de-energized or energized.

52. Railway traffic controlling apparatus comprising a stretch of track divided into blocks, a track circuit for each block including a source of current and a track relay, and means controlled by the track relay of each block for supplying vehicle governing current to the two track rails in multiple of the block next in the rear throughout a portion or all of such block according to the condition of said relay.

53. Railway traffic controlling apparatus comprising a stretch of track divided into blocks, a track circuit for each block including a source of current and a track relay, and means controlled by the track relay of each block for supplying alternating vehicle governing current of one relative polarity to a portion of the block next in the rear or of the opposite relative polarity to the entire length of such block in the rear according to the condition of said track relay.

54. Railway traffic controlling apparatus comprising a stretch of track divided into blocks, a track circuit for each block including a source of current and a track relay, and means for each block for supplying alternating vehicle governing current of one relative polarity to the track rails of each block in multiple from the entrance end to an intermediate point in the block, or of the opposite relative polarity to the track rails in multiple throughout the entire length of the block, according to the condition of the track relay for the block next in advance.

55. Railway traffic controlling apparatus comprising a stretch of track divided into blocks, a track circuit for each block including a source of current and a track relay, and means controlled by the track relay of each block for supplying vehicle governing current of one voltage to a portion of the block next in the rear or of a higher voltage to the entire length of such block.

56. Railway traffic controlling apparatus comprising a stretch of track divided into blocks, a track circuit for each block including a source of current and a track relay, and means controlled by the track relay of each block for supplying vehicle governing current of one relative polarity and at one voltage to the track rails of the block next in the rear through a portion of such block, or of the opposite relative polarity and at a higher voltage to the rails of such block through the entire length of the block.

57. In combination a stretch of railway track divided into blocks, two trackway circuits for each block for governing the passage of trains, one of which circuits includes the two track rails in series and the other of which includes the two track rails in multiple, a track relay for each block included in the first of said circuits but not in the second, and means for controlling the second trackway circuit for each block by the track relay for the block next in advance.

58. In combination, a stretch of railway track divided into blocks, two trackway circuits for each block for governing the passage of trains, one of which circuits includes the two track rails in series and the other of which includes the two track rails in multiple, a track relay for each block included in the first of said circuits but not in the second, and means controlled by each track relay for causing the second trackway circuit for the block next in the rear to include the rails of all or of a portion only of such block.

59. In combination, a stretch of railway track divided into blocks each of which comprises a plurality of sections, and means for each block for supplying traffic governing current to the two track rails thereof in multiple through one or more of said sections.

60. In combination, a stretch of railway track divided into blocks each of which comprises a plurality of sections, a trackway circuit for each block including the track rails thereof in multiple and a source of alternating traffic governing current, and means controlled by traffic conditions in advance of each block for causing such trackway circuits to include one or more of said sections.

61. The method of controlling railway traffic which consists in supplying one alternating traffic governing current to the two track rails in series and a second alternating traffic governing current of the same frequency but differing in phase to the two track rails in multiple.

62. The method of controlling railway traffic which consists in dividing the trackway into blocks, and supplying each block with one alternating traffic governing current which flows through the two track rails in series, and a second alternating traffic governing current of the same frequency but different phase which flows through the two track rails in multiple.

63. The method of governing railway traffic which consists in supplying to the track rails two alternating currents one of which flows in opposite directions in the two rails and the other of which flows through the two rails in multiple, creating corresponding voltages on a vehicle by induction; amplifying such induced voltages, and affecting a common vehicle governing mechanism by such amplified voltages.

64. The method of governing railway traffic which consists in supplying to the track rails two alternating currents one of which flows in opposite directions in the two rails and the other of which flows through the two rails in multiple, creating corresponding voltages on a vehicle by induction, and controlling a common vehicle governing mechanism by such induced voltages.

65. The method of governing railway traffic which consists in supplying to each block two alternating currents one of which flows in opposite directions in the two rails and the other of which flows through the two rails in multiple, and varying the control of a vehicle by varying the portion of the block through which the second current flows.

66. The method of governing railway traffic which consists in supplying the track rails with two alternating currents of the same frequency, shifting the phase of one of said currents relative to the other in accordance with traffic conditions in advance, and affecting a unitary device on a vehicle by the phase relation of said currents.

67. The method of governing railway traffic which consists in supplying the track rails with two alternating currents of the same frequency, controlling the supply of one current and the phase relation of the two currents according to traffic conditions in advance, and affecting a unitary governing device on a vehicle by the phase relation of said currents and the presence and absence of said one current.

68. The method of controlling railway traffic which consists in dividing the trackway into blocks, and supplying each block with one alternating traffic governing current which flows through the two track rails in series and a second traffic governing current which flows through the two track rails in multiple through the entire length of the block or through only a portion thereof.

69. The method of controlling railway traffic which consists in dividing the trackway into blocks, supplying each block with one alternating traffic governing current which flows through the two track rails in series and a second traffic governing current which flows through the two track rails in multiple, and reversing the relative polarity of one of said currents in accordance with traffic conditions in advance.

70. The method of controlling railway traffic which consists in supplying the track rails with two alternating traffic governing currents of the same frequency, reversing the relative polarity of one of said currents in accordance with traffic conditions in advance, and governing a vehicle according to the relative polarities of said currents and the presence and absence thereof.

71. Railway traffic controlling apparatus comprising track rails, means for supplying to said rails two alternating currents of the same frequency but differing in phase, and vehicle carried traffic governing means controlled jointly by said two currents.

72. Railway traffic controlling apparatus comprising track rails, means for supplying to said rails two alternating currents of the same frequency, means for reversing the relative polarity of one of said currents, and vehicle carried traffic governing means controlled jointly by said currents and responsive to such reversal of relative polarity.

73. Railway traffic controlling apparatus comprising track rails, means for supplying to said rails two alternating currents of the same frequency, means for reversing the relative polarity of one of said currents, a three position relay carried by a train and provided with two windings, means also on the train for supplying said relay with alternating currents of the same frequency and the same relative polarity as the currents in the track rails, and means controlled by said relay for governing the vehicle.

74. Railway traffic controlling apparatus comprising means for supplying to the trackway two alternating currents of the same frequency but different in phase, and vehicle carried traffic governing means controlled jointly by said two currents.

75. Railway traffic controlling apparatus comprising means for supplying to the trackway two alternating currents of the same frequency, means for reversing the relative polarity of one of said currents, and vehicle carried traffic governing means controlled jointly by said two currents and responsive to such reversal of polarity.

76. In combination, a block of railway track, means for constantly supplying an alternating vehicle governing current to the rails of said block from the entrance end to an intermediate point in the block, and means controlled by traffic conditions in advance for at times supplying similar current to the rails of said block from said intermediate point to the exit end of the block.

77. In combination, a block of railway track, means for constantly supplying an alternating vehicle governing current to the rails of said block in multiple from the entrance end of the block to an intermediate point in the block, and means controlled by traffic conditions in advance for at times supplying similar current to the rails of said block in multiple from said intermediate point to the exit end of the block.

78. Railway traffic controlling apparatus comprising track rails divided into blocks, a source of alternating current connected across the track rails of each block, means for supplying a second alternating current to the rails of each block, means for each block responsive to dangerous traffic conditions in advance for reversing the relative polarity of one of said currents and cutting off the supply of the second current from a portion of the block; and vehicle carried apparatus responsive to the presence of both of said currents and the normal relative polarity of the reversible current by giving a proceed indication, said apparatus being responsive to the reversal of the relative polarity of one current by giving a caution indication, and to the cessation of either current by giving a stop indication.

79. Railway traffic controlling apparatus comprising track rails divided into blocks, a source of alternating current connected across the track rails of each block, and means for supplying a second alternating current to the rails of each block, means for each block responsive to dangerous traffic conditions in advance for reversing the relative polarity of one of said currents and cutting off the supply of the second current from a portion of the block; a relay carried on a vehicle and controlled by said trackway currents, said relay assuming one controlling condition when both currents are present and the reversible current is of normal relative polarity, a second controlling condition when the relative polarity of one current is reversed, and a third controlling condition when either current is absent; and means governed by said relay for giving a proceed, caution or stop indication according as said relay is in its first, second or third controlling condition.

80. In combination, a railway track divided into blocks, means associated with each block for imparting a proceed influence to a vehicle throughout the entire block under safe traffic conditions in advance, said means operating under unsafe traffic conditions to impart a caution influence to a vehicle through a portion of the block and a stop influence through the remainder of the block, and means carried by a vehicle for receiving said influences and translating them into indications suitable for governing the vehicle.

81. In combination, a block of railway track, means for applying an alternating difference of potential across the track rails adjacent the exit end of said block, means for applying a second alternating difference of potential of one relative polarity or the other along the rails of said block, and vehicle governing means controlled by the currents flowing in the track rails due to said differences of potential.

82. Railway traffic controlling apparatus comprising track rails, means for impressing alternating signaling current thereon, a railway vehicle provided with a receiving coil in inductive relation to a track rail, a circuit on said vehicle including said coil and a capacity device and tuned to resonance at the frequency of said signaling current, and governing means on said vehicle shunted by said capacity device.

83. Railway traffic controlling apparatus comprising track rails, means for impressing alternating signaling current thereon, a railway vehicle provided with a receiving coil in inductive relation to a track rail, a circuit on said vehicle including said coil and a capacity device and tuned to resonance at the frequency of said signaling current, an amplifier on said vehicle provided with an input circuit shunted by said capacity, and vehicle governing means controlled by said amplifier.

84. Railway traffic controlling apparatus comprising track rails, means for impressing thereon alternating signaling current, a railway vehicle, a resonant circuit thereon comprising coils within the magnetic field of said signaling-current in the track rails and a capacity device across the terminals of said coils, and traffic governing means controlled by the alternating potential across said capacity device due to said signaling current.

85. Railway traffic controlling apparatus comprising track rails, means for impressing alternating signaling current thereon, a railway vehicle, a resonant circuit thereon comprising coils within the magnetic field of the signaling current in the track rails, and a condenser across the terminals of said coils, an electron relay on the vehicle comprising a hot filament, a cold anode, and a grid interposed between the two, means for connecting the terminals of said condenser with said filament and grid respectively, a blocking condenser being interposed between the first-mentioned condenser and the grid, a source of current connected to said filament and to said anode, and vehicle governing means controlled by the variations of the current from said last-mentioned source produced by the alternating potential between the grid and the filament due to said alternating signaling current in the track rails.

86. Railway traffic controlling apparatus comprising a trackway and a vehicle for travel thereon, a circuit on said vehicle including a capacity device, means located in the trackway for creating alternating signaling current in said circuit; an electron tube on said vehicle comprising a heated filament, a plate and a grid; said filament and said grid being shunted by said capacity device, a blocking condenser interposed between the grid and said capacity device, a plate circuit for said electron tube, and vehicle governing means controlled by the current in said plate circuit.

87. Railway traffic controlling apparatus comprising track rails, means for impressing thereon two alternating currents of the same frequency but differing in phase, a vehicle provided with means for inductively receiving voltages due to said currents, and governing means on said vehicle controlled by such induced voltages.

88. Railway traffic controlling apparatus comprising track rails, means for impressing thereon two alternating currents of the same frequency but differing in phase, a vehicle provided with means for inductively receiving voltages due to said currents, and signals on said vehicle controlled by such induced voltages.

89. Railway traffic controlling apparatus comprising track rails, means for impressing thereon two alternating currents of the same frequency but differing in phase, a vehicle provided with means for inductively receiving voltages due to said currents, a relay on said vehicle having two windings, means interposed between said receiving means and said relay for supplying said windings with alternating potentials having the same phase relation as that of said induced voltages, and governing means on said vehicle controlled by said relay.

90. Railway traffic controlling apparatus comprising track rails, means for impressing thereon two alternating currents of the same frequency but differing in phase, a vehicle provided with means for inductively receiving voltages due to said currents, amplifiers controlled by said induced voltages, and governing means on the vehicle controlled by said amplifiers.

91. Railway traffic controlling apparatus comprising a trackway and a vehicle for travel thereon, means for supplying alternating current to said trackway, vehicle governing means on the vehicle controlled by said current in the trackway and comprising a plurality of electron tubes each having a cathode filament, and a single source of direct current on said vehicle for energizing all of said filaments.

In witness whereof I affix my signature.

LLOYD V. LEWIS.